UNITED STATES PATENT OFFICE.

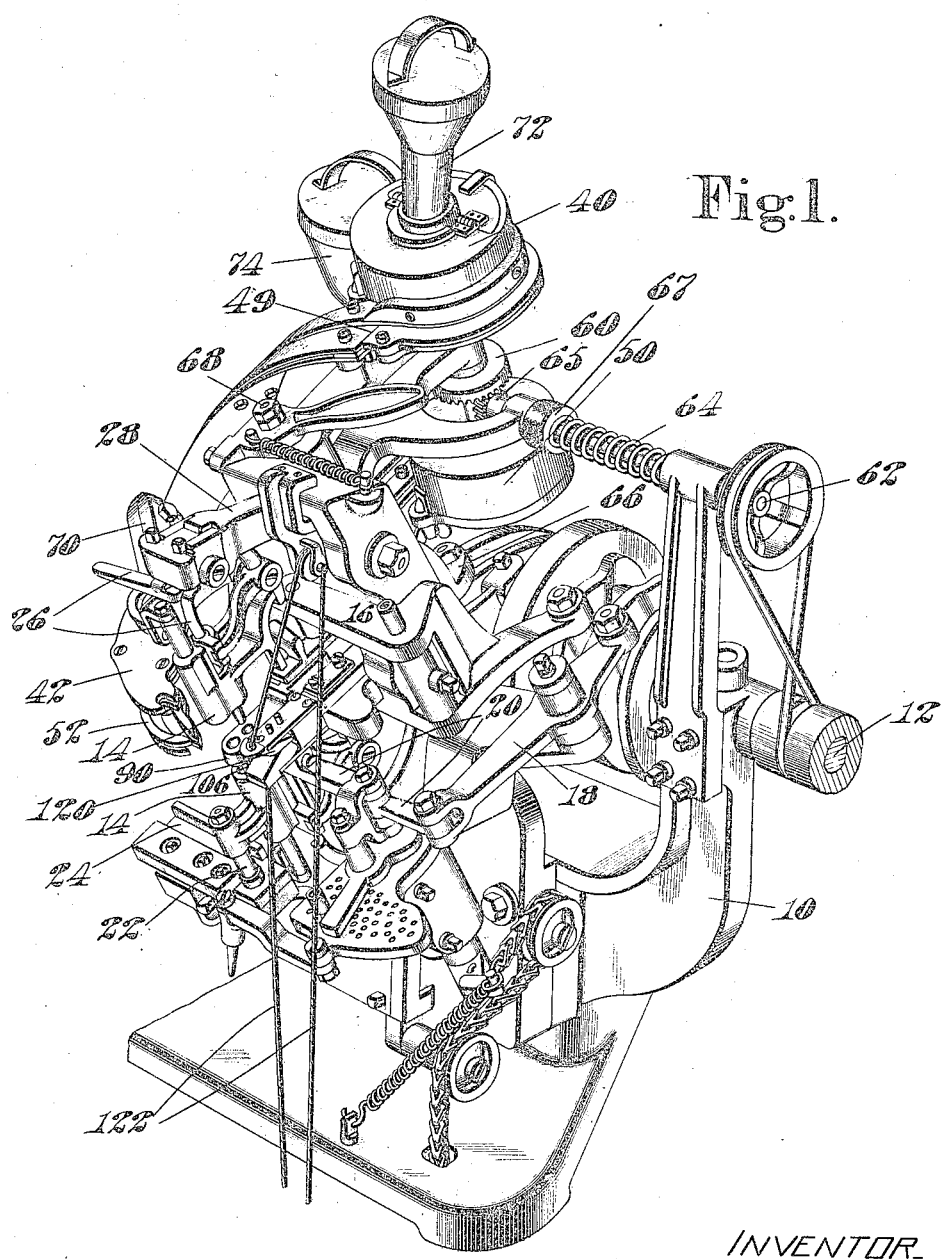

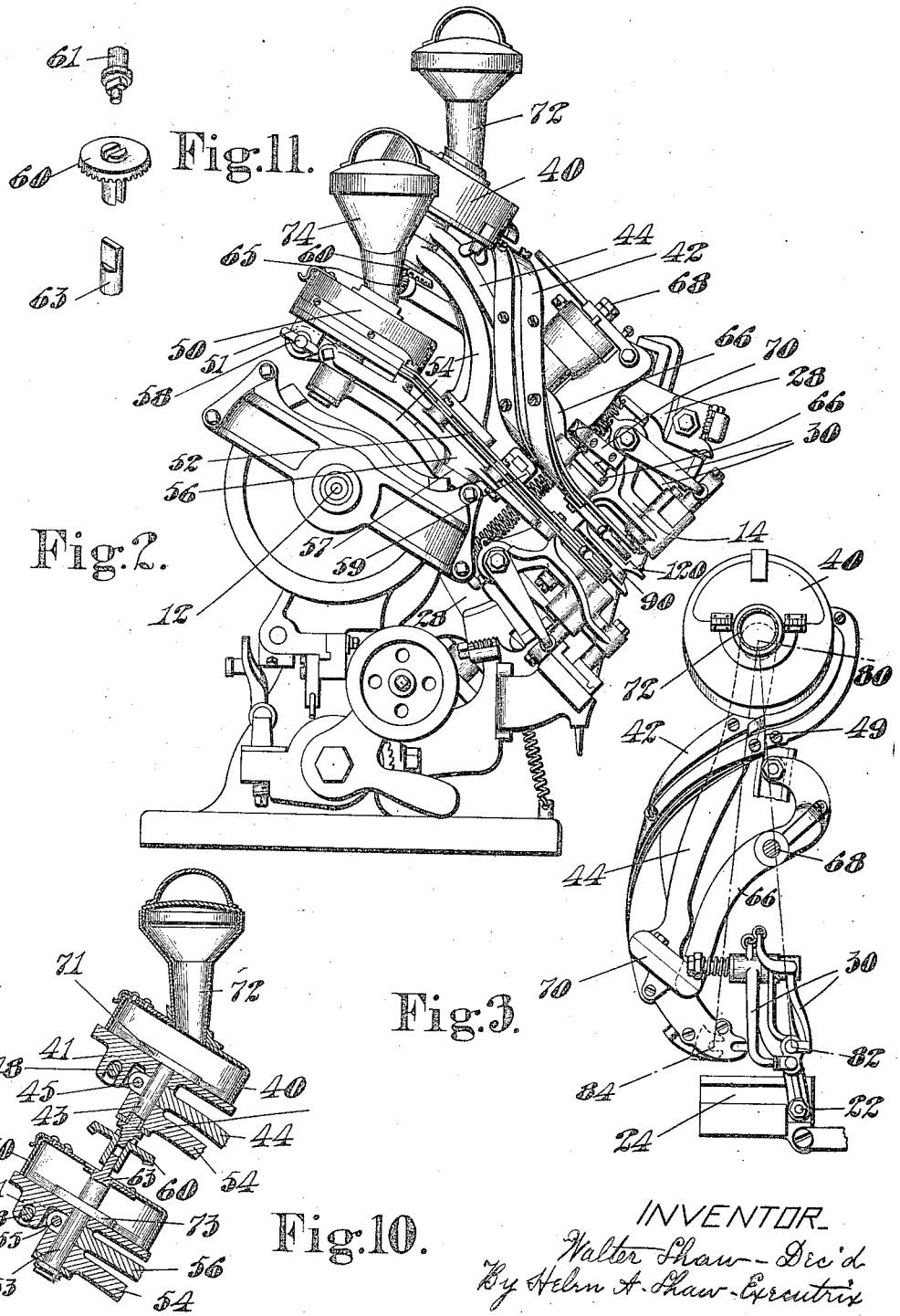

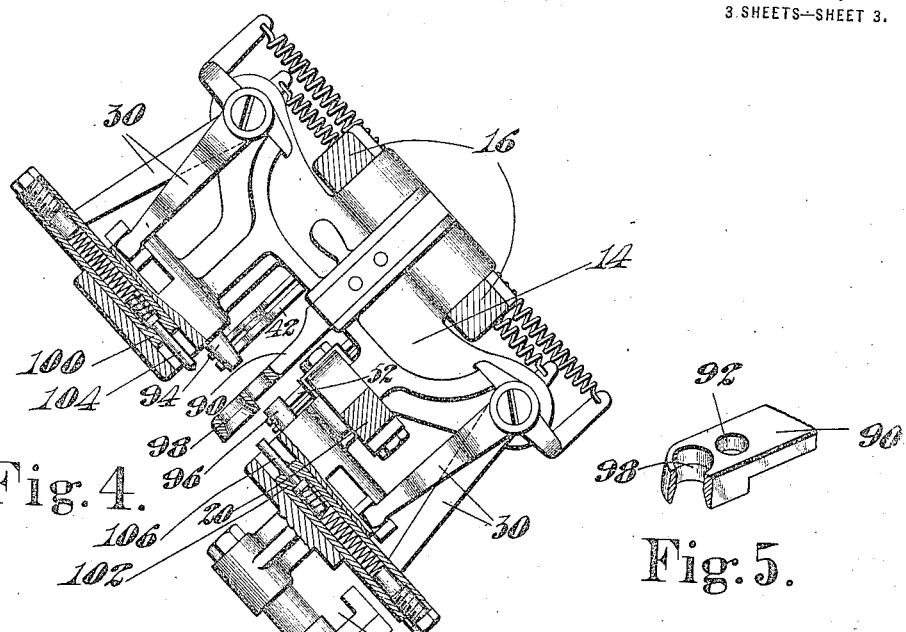

WALTER SHAW, DECEASED, LATE OF DEDHAM, MASSACHUSETTS, BY HELEN A. SHAW, EXECUTRIX, ASSIGNOR TO UNITED SHOE MACHINERY CORPORATION, OF PATERSON, NEW JERSEY, A CORPORATION OF NEW JERSEY.

FASTENER-SETTING MACHINE.

1,423,626.     Specification of Letters Patent.     Patented July 25, 1922.

Application filed October 30, 1918. Serial No. 260,363.

*To all whom it may concern:*

Be it known that WALTER SHAW, late of Dedham, in the county of Norfolk and State of Massachusetts, deceased, invented certain Improvements in Fastener-Setting Machines, of which the following description, in connection with the accompanying drawings, is a specification, like reference characters on the drawings indicating like parts in the several figures.

This invention relates to fastener setting machines and is embodied in an organization particularly adapted for setting two-part or compound fasteners.

One conspicuous example of a two-part fastener is found in the gromet and washer which has for a long time been employed in the making of blankets, sails, hammocks and the like, where it is desired to have a fastener of great holding power. Where fasteners of this sort were used in such large pieces of work the work was so clumsy and the distance between individual fasteners so great that no attempt was made automatically to position the work between the insertion of successive fasteners, and the various types of machines heretofore devised for this general purpose were all designed so as to require positioning of the work by the operator between successive cycles of the machine. When, however, in the manufacture of articles, for example, military leggings and shoes, it was found necessary to employ a compound fastener, more specifically a gromet and washer, there arose a demand for a high speed machine capable of accurately setting compound fasteners at regular intervals and of feeding the work between successive operations.

Accordingly one important object of the invention is to devise an improved fastener-setting machine adapted for setting in a single operation the co-operating parts of a compound fastener and of feeding the work to space successive fasteners. The invention will be described by reference to a machine designed primarily for setting gromets and washers in army leggings but it will be understood that this is merely illustrative and that the invention is adapted for use in machines for inserting other fasteners and operating on other types of work.

In accordance with this object, various features of the invention consist in the provision of a machine arranged to support the work so that the operator may readily guide the same, to feed the parts of the fasteners automatically to the tools, and to feed the work to space the fasteners at regular intervals. In the preferred embodiment of the invention, the machine is provided with two co-operating setting tools arranged in axial alinement and each movable toward and away from the work. This allows the work to be supported at an intermediate level which remains unchanged during the operation of the machine. As shown, suitable hoppers and connected raceways are provided for feeding the parts of the fasteners automatically to the tools and manual interference is thereby avoided and the danger of injury to the operator minimized. Preferably too, the feeding of the work is accomplished by bodily moving the setting tools laterally at the completion of the setting operation while they are still in engagement with the fasteners.

With compound fasteners of the type under consideration, it is axiomatic that the washer be provided with an aperture sufficiently large to pass over the barrel of the gromet. On the other hand, the diameter of the washer-supporting spindles commonly utilized in connection with the setting tools of a machine of this general nature is limited by the internal diameter of the barrel of the gromet. It follows, therefore, that the aperture of the washer is considerably larger than the diameter of the spindle by which it is supported and consequently that there is no assurance of the proper positioning of the washer with respect either to the associated gromet or the tool by which it is presented. It has been found that the work may be most readily presented to the machine by the operative if the tools are arranged at an angle of 45° so that the line of vision of the operative is normal to the work presented to the machine. With this arrangement, however, the difficulty of properly positioning the washer is accentuated because the washer then tends to fall toward one side of its supporting spindle.

Another object of the invention is to provide means constructed and arranged to assure accuracy and certainty in putting together the parts of the fastener, so as to avoid errors and consequent interruption to remove imperfectly set fasteners.

In this aspect, a feature of the invention consists in a novel organization for positioning each part of the fastener with respect to the tool which presents it to the other part. In the illustrated embodiment of the invention, the lateral positioning of the washer is effected by relative movement of the washer carrying tool and a member adapted to engage the washer so as to center it with respect to this tool. As shown, this member consists of a plate which is utilized for supporting the work, and which is provided with a tapered hole, the bore of which engages the periphery of the washer and gradually forces it to a central position upon the spindle as the setting tool moves toward the work.

Another feature of the invention is a novel organization, comprising two pairs of tools in which the members of each pair are constructed and arranged to be brought into operative relation with one another and the work by axial movement toward and away from the work.

Other features of the invention will appear from a consideration of the following description of one particular embodiment of the invention which is illustrated in the accompanying drawings, in which,—

Fig. 1 is an angular view of the machine taken from the right;

Fig. 2 is an end view of the machine from the left;

Fig. 3 is a fragmentary plan view showing the relation of the upper raceway and its pivot, to the operating tools;

Fig. 4 is a side elevation, partly in section, of the tool carrying frame and the operating tools;

Fig. 5 is an angular view, with a part broken away, of the intermediate apertured plate which helps to support the work between the tools; and Figs. 6 to 9 inclusive are fragmentary vertical sections of the operating tools in successive positions during the cycle of the machine;

Fig. 10 is a sectional view in a vertical plane through the hopper-assemblage;

Fig. 11 includes three disjointed parts which, in practice, fit one into another to couple and drive the rotary elements of the two hoppers.

The illustrated machine comprises a frame 10 having a power operated cam shaft 12. The operating tools are supported in a U-shaped frame 14 pivoted upon a lever 16 mounted upon the frame and controlled from the cam shaft for movement of the frame forward and back so as to bring the pairs of tools successively to operative position. Lateral movement of the tool carrying frame to impart feeding movement to the work is effected from a cam operated lever 18 connected by links 20 to the frame 14 in similar fashion as in Letters Patent of the United States No. 934,066, granted Sept. 14, 1909 upon an application of George Goddu. The frame 14 is guided in a straight line by the co-action of a stud 22 thereon with a guideway 24 upon the frame of the machine. Operating movement of the tools toward the work is effected by means of hammers 26 carried upon similar, oppositely disposed, levers 28 pivotally mounted in the frame of the machine and controlled from the cam shaft 12 for simultaneous movement to cause the approach of the co-acting tools of each pair. The retraction of the tools is effected by means of spring operated levers 30.

The respective parts of the compound fasteners are supplied to the operating tools from hoppers 40 and 50 through corresponding raceways 42 and 52 by means of which the parts of the fasteners are guided to the spindles of the respective tools. It will be noted that the axis of the operating tools is disposed at approximately 45° to the horizontal and that the operating ends of the raceways are necessarily disposed at right angles thereto and hence at the same angle to the horizontal. It has been found, however, that the operation of the hoppers is improved and the jamming of the eyelets against the ports is minimized if they are disposed at a different angle, preferably so that their bases are at approximately 30° with the horizontal.

The hoppers and raceways are supported primarily from the frame by means of a forked bracket 54 secured to the frame and provided at its ends with bearings for bushings 43 and 53 (see Fig. 10). Mounted upon these bushings and clamped thereto by means of locking bolts 45 and 55, are forwardly extending brackets 44 and 56. The upper of these brackets is attached at its forward end to the forward end of the raceway 42 while the lower bracket 56 is attached to and supports the lower raceway 52. It will be noted from Fig. 2 that the lower bracket 56 is provided with a bearing surface 57 which is maintained in sliding engagement with a portion of the frame and assists in preventing vibration of the outer ends of the raceways. The brackets 44 and 56 are provided with rearward extensions having clamping bolts 48 and 58 provided with wing nuts by means of which the hoppers may be clamped to these supporting brackets. It will be noted that the hoppers are provided with forked lugs 41 and 51 for engagement over the clamping bolts. The guiding chute attached to the hopper abuts the upper end of the raceway at a point 49 (Fig. 3) without being joined thereto. The hoppers are, therefore, readily detachable from the machine without removing the raceways.

The usual agitators 71 and 73 are driven by shafts 61 and 63 having a tongue and slot connection to a bevel gear 60 driven from a gear 65 mounted upon a shaft 62 which may be belt connected to the driving shaft 12. A spring 64 acting against a nurled collar 67 attached to the bevel gear 65 tends to keep these gears in mesh and allows a lateral displacement of the gear 65 in order to remove the brush driving shafts from either of the hoppers. The two raceways are rigidly connected together by a tongue and slot connection 59 and lateral movement is imparted to them by means of a cam operated lever 66 pivoted at 68 and connected to the raceways by means of a ball and socket connector 70. Funnels 72 and 74 may be provided to assist in introducing the supply of fasteners into the respective hoppers.

Attention is called to the plan view in Fig. 3 from which it will be seen that the pivotal point 80 around which the hoppers and the raceway supporting levers swing is so disposed that it is in a perpendicular erected substantially midway of a line drawn between the operating point 82 and the extreme point of movement 84 of the end of the raceways. By reason of this arrangement the character of movement of the ends of the raceways is improved and any possibility of interference between the ends of the raceways and the forked head carrying the operating tools resulting from the angular relation of the axes thereof is minimized or entirely eliminated.

Supported upon the tool carrying frame 14 and in the path of the operating tools is a plate 90 which is provided with an aperture 92 to allow co-action of the punch 94 with its punch block 96 (see Fig. 6) and with an aperture 98 to allow the co-action of the upper set 100 with the lower set 102 (see Fig. 8). It will be noted that the punch is preferably a tubular punch which co-acts with a flat surfaced punch block which is lifted so that its surface is at the level of the lower surface of the work and hence the upper surface of the intermediate plate 90 at the time that the punch 94 is passing through the work. The upper set 100 is provided with a spring pressed spindle 104 of the usual type while the lower set 102 is provided with a smaller spindle 106 here shown as spring supported. After the punching operation, shown in Fig. 6, has been completed, the tool carrying head 14 is moved rearwardly by means of the lever 16 to bring the sets into alinement with the punched hole in the work. During this movement the work is held in position by means of presser feet 120 which may be separated by means of a flexible cable 122 to allow admission of the work therebetween. In the preferred arrangement the upper raceway 42 is supplied with gromets or eyelets and the lower raceway 52 is supplied with the co-operating parts of the fasteners, such as washers. The passage of the washers along the raceway is facilitated if they are provided with a slight barrel so that the tendency to overlap and become jammed in the raceway is eliminated. As in all similar machines, the ends of the raceways are moved to bring the endmost fasteners therein into alinement with the operating tools, to wit the sets 100 and 102, and after the fasteners have been threaded by the spindles 104 and 106 the raceways are withdrawn to allow the sets to be moved together to effect the clinching of the fasteners. The spindle 104 of the top set is preferably designed to fit rather closely within the barrel of the gromet or eyelet so as to support the latter frictionally. On the other hand, the spindle 106 of the bottom set necessarily can be made no larger than the spindle of the top set. It is preferably made as small as consistent with strength in order to allow the bottom set to be provided with an upstanding clinching surface 108, which is shaped to engage the end of the barrel of the gromet and to start to spread the same before the end of the barrel strikes the upsetting surface proper 110 of the lower set 102. Surrounding this upsetting surface 110 is an annular recess 112 for supporting the flange of the washer as the fasteners are brought into co-operative relation with one another and the work. Inasmuch as the opening in the washer must necessarily be large enough to pass over the barrel of the gromet, it follows that it must necessarily be considerably larger than the diameter of the spindle 106. It is necessary that the washer be centrally positioned with respect to the set that presents it. In the illustrated machine the inclination of the operating tools is such that gravity will displace the washer with respect to the axis of the tool. If this condition were allowed to stand at the time that the fasteners are brought together the end of the barrel of the gromet would not pass through the opening in the washer but would be crumpled against the inner side of the washer.

This invention, however, provides means for insuring the desired cooperative relation of the washer and gromet at the moment when the latter is about to enter the hole in the washer. For example, the hole 98 in the work-plate 90 is tapered and is of such diameter as to centralize the washer as the latter passes through it. The effect of this centering device is shown by Fig. 8 in conjunction with Fig. 7.

After the setting of the fasteners, the setting tools are slightly released and the head 14 carrying the tools and the plate 90 is moved laterally to feed the work by the cam operated lever 18 and the connecting links 20. Any usual or desired means for varying the spacing, such as those described in the Goddu patent above mentioned, may be utilized in connection with this invention.

Having thus described the invention, what is claimed as new and desired to be secured by Letters Patent of the United States is:—

1. In a fastener setting machine, axially movable, oppositely arranged setting tools, and movable raceways arranged to deliver the co-operating parts of a fastener to the respective tools, one of said fastener parts having a portion adapted to project through the work, said tools being constructed and arranged to present said parts of the fastener to opposite sides of a piece of work and to bring them into co-acting relation with each other, one of said tools being arranged to engage and upset said projecting portion to secure the two parts of the fastener to the work.

2. A machine for setting compound fasteners, comprising cooperative setting tools one of which has a seat for one part of the fastener and a surface for engaging and clenching the other part of the fastener, movable raceways for supplying the component parts of a fastener to said tools respectively, mechanism constructed and arranged to cause said tools to take component fastener parts from the raceways respectively and secure them to the work in cooperative relation to each other, and means arranged to shift one of the fastener parts from a position out of registration to a position in registration with said seat while its setting tool is carrying it toward the work.

3. In a machine for attaching compound fasteners one part of which is an annular member, raceways for the respective parts of said fasteners, a pair of cooperative reciprocatory setting devices, and mechanism constructed and arranged to cause said setting devices to remove the component parts of successive compound fasteners from the raceways and to feed the work.

4. In a machine for attaching compound fasteners one part of which is an annular member, raceways for the respective parts of the fasteners, a punch arranged to make a hole in the work, and setting devices arranged to engage the parts of said fastener in the respective raceways and remove the same to set them in the work, one of said setting devices having a projecting member adapted to thread the lowermost annular member in its raceway and a hole in the work.

5. In a machine for attaching a compound fastener comprising an inner part and an outer annular part, raceways for the respective parts of the fasteners, and setting devices arranged to take complemental fastener parts from the respective raceways and set them in cooperative relation to a hole in the work, one of said setting devices having a projecting member adapted to thread the outer fastener part in its raceway and thereafter thread the said hole in the work.

6. In a machine for setting compound fasteners, a work-support, a tool-head, a pair of cooperative punching tools and a pair of cooperative setting tools arranged to slide in bearings in said head, means for supplying the component parts of compound fasteners, and mechanism for operating first one and then the other of said pairs of tools so as to punch a hole in the work and then to cause said setting tools to transfer the component parts of a fastener from said supplying means to opposite faces of the work and to apply the fastener to said hole in the work.

7. In a fastener setting machine, cooperating setting tools arranged to present the co-operating parts of a compound fastener to opposite sides of a piece of work and to set them in the work, and independent mechanism co-acting with one part of the fastener to position it with respect to the other part.

8. In a machine for setting compound fasteners, a member having a tapering hole of fixed dimensions, and two cooperative setting tools one of which is arranged to carry one of the component parts of a compound fastener through said tapering hole to the setting locality, said hole being adapted to correct the position of such fastener part relatively to its carrying tool without materially resisting the advancement of said part.

9. In a fastener setting machine, oppositely disposed movable fastener setting tools, an apertured intermediate plate disposed between said tools and arranged to support the work, and means for supplying the co-operating parts of a compound fastener to the respective tools, said plate being constructed and arranged to assist in positioning one part of the fastener with respect to one of the tools.

10. In a fastener setting machine, co-operating setting tools, one of said tools being axially movable and provided with a spindle, means for supplying fasteners to one of said tools, and means constructed and arranged to cause lateral movement of a fastener with respect to said spindle in consequence of axial movement of the tool by which the fastener is advanced.

11. In a fastener setting machine, relatively movable co-operative setting tools one of which is provided with a spindle, means for supplying annular fasteners thereto having an aperture larger than the diameter of the spindle, and means for laterally positioning a fastener upon the spindle in consequence of relatively moving the tools into coacting relation.

12. In a fastener setting machine, relatively movable co-operative setting tools one of which is provided with a spindle, and fastener engaging means, said tool and spindle and the fastener engaging means being relatively movable and constructed and arranged so that relative movement thereof will correct the lateral position of a fastener relatively to the tool by which the fastener is sustained.

13. A fastener-setting machine comprising a work-support having a hole, and fastener-setting mechanism including a movable tool arranged to pass a fastener through said hole and present the fastener to the work, the wall of said hole being tapered so as to engage the fastener and position it relatively to said tool.

14. A fastener-setting machine comprising fastener-setting mechanism including a movable setting tool for carrying a fastener to the work, and stationary means arranged to engage the fastener so as to determine its lateral position while it is being carried by the tool as aforesaid.

15. A fastener-setting machine comprising mechanism for setting telescopic compound fasteners, raceways for supplying the inner and outer parts of such fasteners, said mechanism including cooperative setting tools having spindles arranged to take the component parts of a fastener from said raceways respectively and present them to the work, and a work-support constructed and arranged to center the outer part of the fastener relatively to the tool by which it is presented.

16. In a fastener setting machine, coacting setting tools movable toward and away from one another, means for supplying gromets to one of said tools, means for supplying washers to the other of said tools, and means for moving said tools laterally to feed the work.

17. In a fastener setting machine, co-operating setting tools disposed at an angle to the vertical and movable toward and away from one another for setting the co-acting parts of a compound fastener upon opposite sides of a piece of work, means for supplying the parts of the fastener to the respective tools, and means arranged to move one of said parts to a predetermined position relatively to its setting tool while the latter is carrying it toward the work.

18. A machine for setting gromets and washers, comprising setting mechanism, means for supplying gromets to said mechanism, means for supplying washers to said mechanism, the latter including a setting tool constructed and arranged to thread a washer in said washer-supplying means and transfer it from the latter to the work, and means arranged to guide the washer to the work so as to shift the washer laterally to a predetermined position relatively to said tool.

19. In a fastener setting machine, relatively movable co-operating setting tools disposed at an angle to the vertical, an intermediate work supporting plate disposed at a similar angle to the horizontal, means for supplying gromets to the upper one of said tools, and means for supplying washers to the lower tool, said intermediate plate being constructed and arranged to center the washers supplied to the lower tool as they are brought into co-acting engagement with the work.

20. In a fastener-setting machine, two raceways arranged to deliver the complemental annular parts of a two-part annular fastener at opposite sides of the plane of the work, respectively, and two cooperative setting tools movable toward and from each other and having central parts arranged to pass through the two parts of such fastener in their respective raceways so as to detach them from the raceways, said tools being arranged to apply the detached fastener parts to the work.

21. In a machine for setting fasteners, two cooperative setting tools constructed and arranged to set a barrel member and a reinforcing member of a compound fastener in telescopic relation, and means arranged to supply the barrel member and the reinforcing member to said tools respectively, the tool for the reinforcing member having an annular seat for the latter and having an annular clenching portion the maximum diameter of which is less than the minimum diameter of said seat, said clenching portion being arranged to clench the barrel member against the reinforcing member.

22. A machine for setting cooperative annular fasteners in telescopic relation, comprising cooperative setting tools one of which is movable toward and from the other, means for supplying telescopic fasteners to said tools respectively, means associated with one of said tools to support the smaller fastener frictionally by engagement with its internal surface, and means for imparting relative movement to said tools to insert the smaller fastener through the other and to clench the smaller fastener against the other.

In testimony whereof I have signed my name to this specification.

HELEN A. SHAW,
*Executrix of Walter Shaw, deceased.*